United States Patent [19]

Okabe et al.

[11] 4,078,530
[45] Mar. 14, 1978

[54] SPARK IGNITION TYPE FOUR CYCLE INTERNAL COMBUSTION ENGINES

[75] Inventors: Itsuro Okabe, Hiroshima; Toshimitsu Tanaka, Yamaguchi, both of Japan

[73] Assignee: Toyo Kogyo Co., Ltd., Japan

[21] Appl. No.: 705,262

[22] Filed: Jul. 14, 1976

[30] Foreign Application Priority Data

Jul. 14, 1975 Japan .................................. 50-86449

[51] Int. Cl.² .......................................... F02B 75/18
[52] U.S. Cl. .............................. 123/52 M; 123/188 M; 123/191 M
[58] Field of Search ............. 123/30 C, 52 M, 188 M, 123/191 M

[56] References Cited

U.S. PATENT DOCUMENTS

| 2,920,613 | 1/1960 | Vogel et al. | 123/188 M |
| 3,150,654 | 9/1964 | Robison | 123/191 M |
| 3,270,733 | 9/1966 | Steidler | 123/188 M |
| 3,411,490 | 11/1968 | Akana | 123/188 M |
| 3,890,949 | 6/1975 | Elsbett et al. | 123/30 C |
| 3,945,363 | 3/1976 | Elsbett et al. | 123/188 M |

FOREIGN PATENT DOCUMENTS 938,887  10/1963  United Kingdom ............ 123/188 M

*Primary Examiner*—Charles J. Myhre
*Assistant Examiner*—David D. Reynolds
*Attorney, Agent, or Firm*—Fleit & Jacobson

[57] ABSTRACT

Four cycle internal combustion engine including an intake passage leading to an intake port formed in the cylinder head. The intake passage comprises a first passage section connected to the intake port with an inclination so that intake air-fuel mixture is introduced into the engine working chamber with a circumferential velocity component to produce a swirl in the working chamber. The intake passage further includes a second and third sections which together with the first section form a meandering substantially S-shaped passage to establish a stratified fuel distribution in the passage.

11 Claims, 5 Drawing Figures

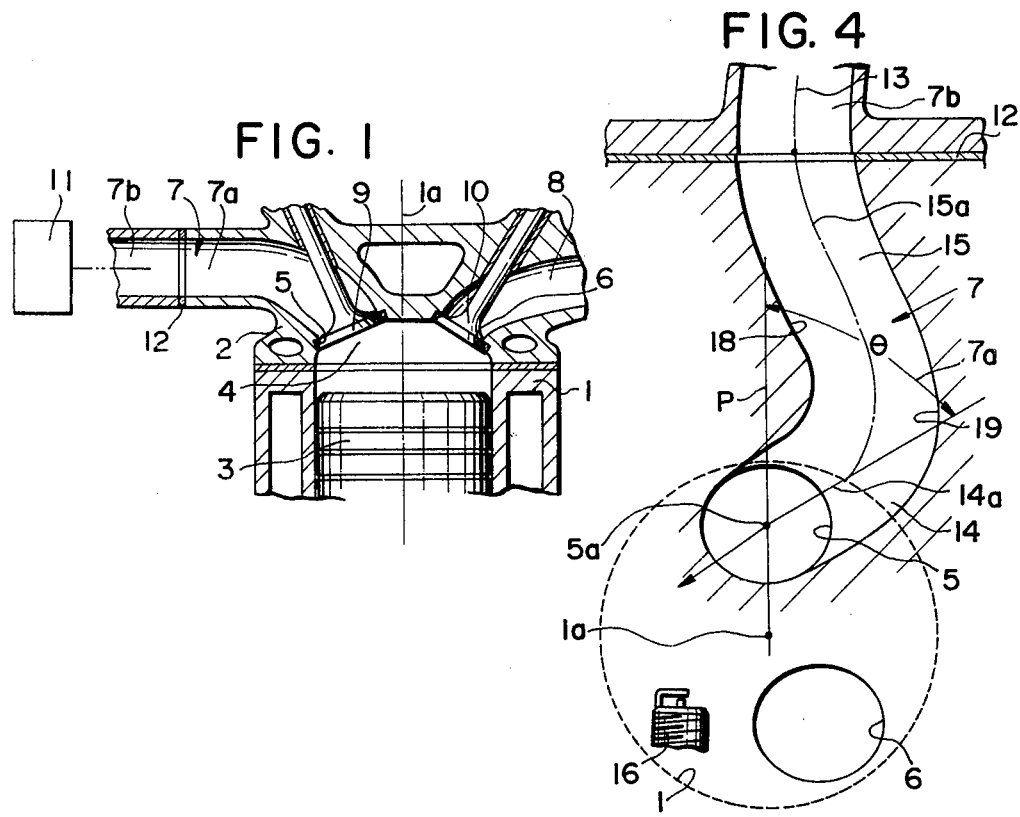
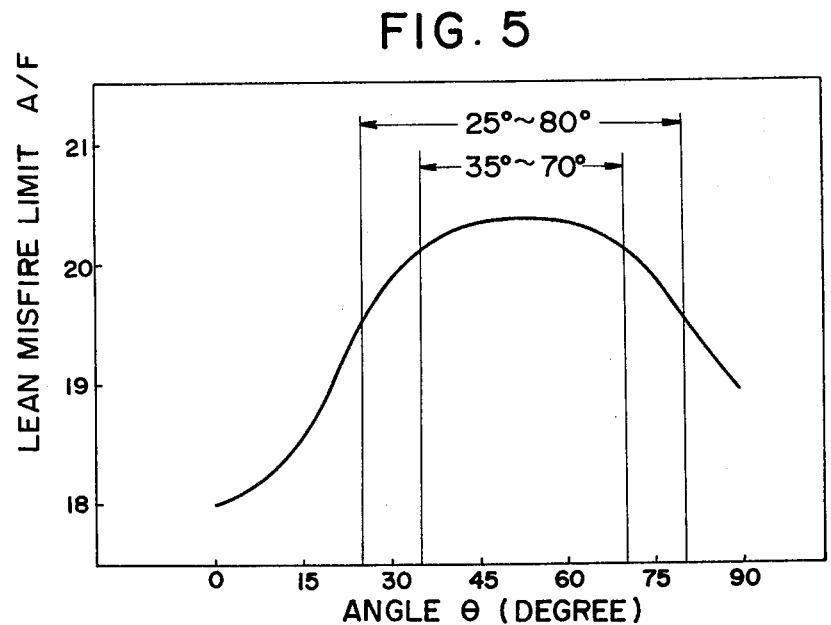

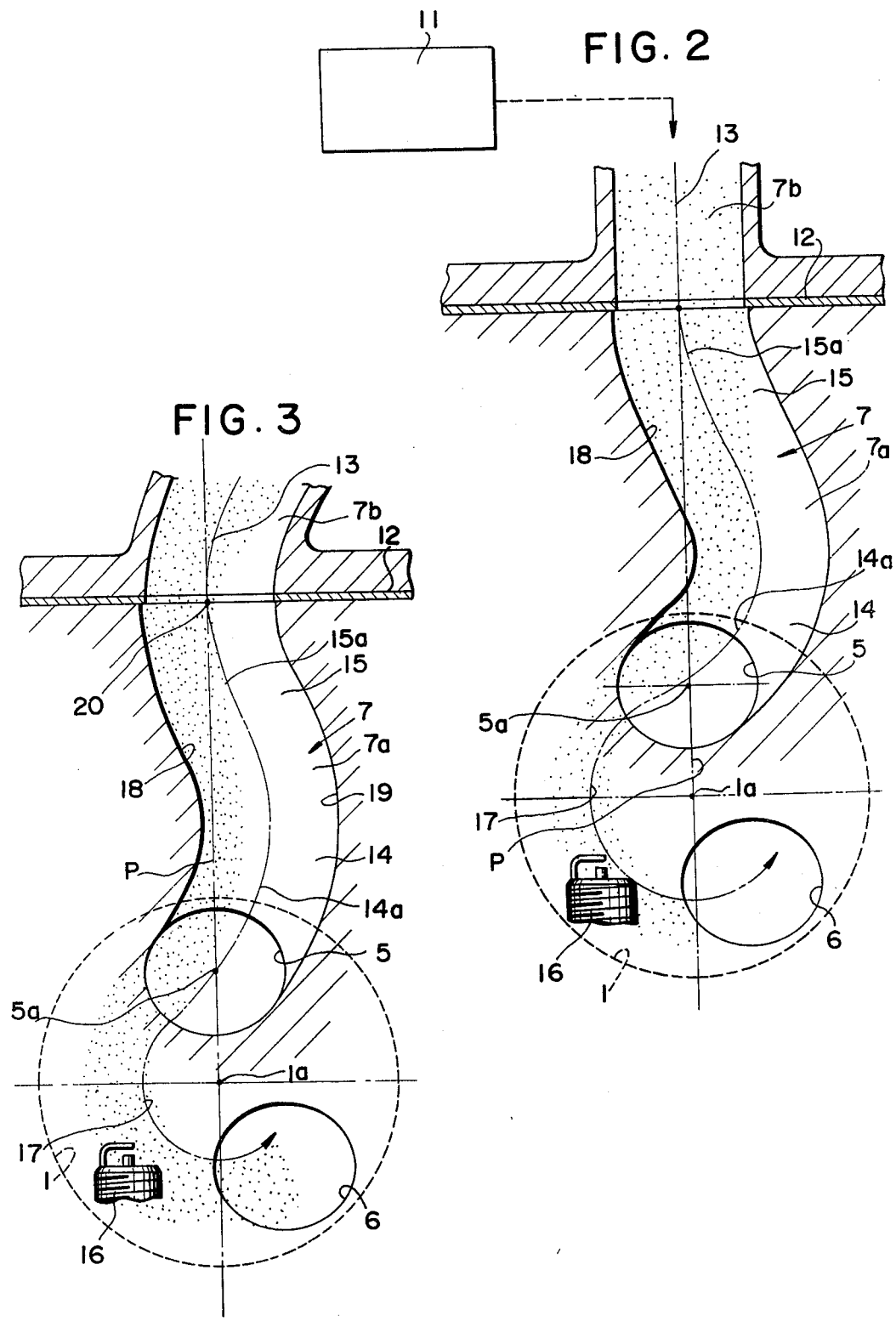

SPARK IGNITION TYPE FOUR CYCLE INTERNAL COMBUSTION ENGINES

The present invention relates to internal combustion engines and more particularly to four-cycle internal combustion engines wherein air-fuel mixture is introduced through intake passages to combustion or working chambers.

In four-cycle internal combustion engines, it has been common to design intake passages in such a manner that strong swirl of air-fuel mixture is produced in combustion or working chambers. For the purpose, the intake passages are curved or inclined in the vicinity of associated intake ports so as to produce tangential or circumferential component of the mixture flow which is being taken into the combustion or working chambers.

It has been found, however, that there is a tendency in this type of engine that a relatively rich air-fuel mixture is formed in the central portion of the working chamber and a relatively lean mixture in the circumferential or peripheral portion thereof. This tendency is caused by the fact that the fuel component in the mixture is forced under the influence of centrifugal force radially outwardly of the curvature when the mixture passes through the curved portion of the intake passage to concentrate along the radially outward wall surface of the curved portion, and the concentrated fuel component is introduced into a relatively central part of the working chamber.

This tendency of fuel concentration is disadvantageous in spark ignition type four-cycle engines because ignition plugs are normally located, due to the limitation of available spaces, apart from the central portions of the combustion or working chambers where a relatively rich air-fuel mixture is formed.

In order to eliminate the above problems, there has already been proposed to employ two carburetors in a single engine, one for providing a relatively rich mixture and the other for providing a relatively lean mixture. The rich and lean mixtures thus produced are introduced into the combustion chamber in such a manner that there is established a stratified fuel distribution wherein relatively rich air-fuel mixture prevails in the peripheral portion of the combustion or working chamber so that the ignition plug is surrounded by an atmosphere containing relatively rich fuel. However, this proposal is disadvantageous in that two carburetors are required and engine structures become complicated.

It is therefore a primary object of the present invention to provide spark ignition type internal combustion engines having intake passage means which is simple in construction but can provide a stratified fuel distribution in engine working chamber with a relatively rich air-fuel mixture in the peripheral portion thereof.

Another object of the present invention is to provide four-cycle internal combustion engines having an intake passage which is supplied with air-fuel mixture from a single carburetor and which can effectively provide in the working chamber a stratified fuel distribution with a relatively rich mixture in the peripheral portion of the working chamber.

A further object of the present invention is to provide spark ignition type four cycle internal combustion engines having improved and simple intake means which can provide a stratified fuel distribution with a relatively rich air-fuel mixture in the peripheral portion of working chamber where ignition spark generating means is normally located.

Still further object of the present invention is to provide four cycle engines having improved intake means which can readily be employed in conventional engines without substantial modification thereof.

According to the present invention, the above and other objects can be accomplished by a spark ignition type four cycle engine comprising cylinder means having an axis, piston means disposed in said cylinder means for reciprocating movement, cylinder head means mounted on the cylinder means to define therein working chamber means of which volume varies in response to the reciprocating movement of the piston means, intake port means formed in said cylinder head means and being associated with intake valve means, exhaust port means formed in said cylinder head means and being associated with exhaust valve means, intake passage means connected with said intake port means, means for providing a supply of air-fuel mixture to the intake passage means, said intake passage means having a first section adjacent to the intake port means which is inclined with respect to a plane including the axis of the cylinder means and passing through center of the intake port means in such a manner that the air-fuel mixture passing therethrough is applied with a velocity component in circumferential direction of the cylinder means to produce a swirl of air-fuel mixture, ignition plug means provided on said cylinder head means; the improvement comprises the fact that the intake passage means includes a second section leading to the first section and inclined with respect to said plane in a direction opposite to the direction of inclination of the first section to provide together with the first section a curved passage portion having radially inward and outward walls, said intake passage means further including a third section leading to the second portion and generally directed toward the radially inward wall of the curved passage portion.

In accordance with the feature of the present invention, air-fuel mixture in the intake passage means is first directed through the third section of the intake passage means toward the radially inward wall of the curved portion and then guided to flow along the curved portion to the intake passage means. In this instance, substantial part of fuel component in the mixture is passed under the influence of its own inertia substantially along the radial inward wall of the curved passage portion to form a stratified fuel distribution in the intake passage means with a relatively rich mixture along the radial inward wall of the passage portion. The stratified air-fuel mixture is introduced into the working chamber means with the rich portion in the peripheral part of the working chamber means. Further, the swirl produced in the working chamber means enhances concentration of fuel component to the peripheral part of the working chamber means. Thus, the ignition plug will be surrounded by an atmosphere of relatively rich air-fuel mixture which can readily be ignited substantially without fail when the plug is energized.

According to the present invention, the third section may be directed substantially parallely with respect to said plane including the axis of the cylinder means and passing through the center of the intake port means or, alternatively, may be inclined with respect to said plane in a direction opposite to the direction of inclination of the second section to form a substantially S-shaped flow passage configuration.

In normal four-cycle engines, the intake passage means is so formed that substantial part thereof lies in the plane including the cylinder axis and passing through the center of the intake port means. In such an arrangement, the concept of the present invention can best be embodied simply by providing the first and second passage sections in the cylinder head means. Similarly, the present invention can also be embodied without substantial modifications even when the substantial part of the intake passage means is sidewardly offset from said plane.

In an engine embodying the present invention, it is preferable that the ignition plug is located on or outside a circle having a center aligned with the cylinder axis and a diameter equal to the distance between the cylinder axis and the center of the intake port means.

The above and other objects and features of the present invention will become apparent from the following descriptions of preferred embodiments taking reference to the accompanying drawings, in which:

FIG. 1 is a fragmentary vertical sectional view of an internal combustion engine embodying the feature of the present invention;

FIG. 2 is a horizontal sectional view of the engine shown in FIG. 1 diagrammatically showing the air-fuel mixture intake system;

FIG. 3 is a horizontal sectional view similar to FIG. 2 but showing another embodiment of the present invention;

FIG. 4 is a horizontal sectional view similar to FIGS. 2 and 3 but showing a further embodiment; and, FIG. 5 is a diagram showing the relationship between the lean misfire limit air-fuel ratio and the angle of intake mixture flow with respect to a plane including the cylinder axis and passing through the center of the intake port. de Referring now to the drawings, particularly to FIG. 1, the spark ignition type four cycle engine shown therein comprises a cylinder 1 having a longitudinal axis 1a. A cylinder head 2 is secured to the upper end of the cylinder 1 and a piston 3 is received in the cylinder 1 for slidable reciprocating movement. Thus, the cylinder 1, the cylinder head 2 and the piston 3 define a combustion or working chamber 4 of which volume changes in response to the reciprocating movement of the piston 3. The cylinder head 2 is formed with an intake port 5 and an exhaust port 6 which respectively communicate with an intake passage 7 and an exhaust passage 8. As conventional in the art, the intake and exhaust ports 5 and 6 are associated with an intake valve 9 and an exhaust valve 10, respectively, which are cyclically opened in the manner well known in the art. The intake passage 7 is connected with a carburetor 11 which may be of a conventional float type for providing a supply of air-fuel mixture to the passage 7. However, it should be noted that the carburetor 11 may be substituted by any other type of fuel supply device which in effect can provide air-fuel mixture in the intake passage 7. Although not shown in FIG. 1, an ignition plug is installed on the cylinder head 2.

In the illustrated embodiment, the intake passage 7 is constituted by a passage portion 7a which is formed in the cylinder head 2 and a intake conduit portion 7b connected with the cylinder head with intervention of a sealing gasket 12. Referring to FIG. 2, it will be noted that in this embodiment the intake conduit portion 7b has a longitudinal axis 13 lying substantially in a plane P which includes the axis 1a of the cylinder 1 and the center 5a of the intake port 5.

The passage portion 7a includes a first passage section 14 communicating with the intake port 5 and having an axis 14a which is inclined with respect to the plane P so as to direct the intake mixture flow circumferentially of the cylinder 1 for producing a swirl of air-fuel mixture. The passage portion 7a further includes a second passage section 15 extending between the conduit 7b and the first section 14. The second passage section 15 has an axis 15a which is inclined with respect to the plane P in the direction opposite to the direction of inclination of the first section 14.

It should of course be noted that the junction between the conduit portion 7b and the second section 15, and that between the first and second sections 14 and 15 are curved so that a smoothly meandering flow passage is defined. The first and second sections 14 and 15 may themselves be generally curved or have straight portions which are smoothly connected with curved junctions. In any event, the first and second sections 14 and 15 can be considered as providing a curved flow passage having a radially inward wall 18 and a radially outward wall 19.

It should further be noted that, although in the illustrated embodiment the second passage section 15 starts immediately at the junction with the conduit portion 7b, it is of course possible to provide in the passage portion 7a a straight part of a certain distance in alignment with the conduit portion 7b and the second section 15 may be formed between the straight part and the first section 14.

The ignition plug 16 is located in the vicinity of a circle 17 having a center coinciding with the cylinder axis 1a and a radius equal to the distance between the cylinder axis 1a and the center of the intake port 5. Preferably, the ignition plug 16 is located on or outside the circle 17.

In operation of the engine shown in FIGS. 1 and 2, the air-fuel mixture which has passed through the conduit portion 7b is introduced into the second passage section 15 and guided by the radially inward wall 18 toward the first passage section 14. Since the fuel component in the mixture has a larger inertia than the air component, there is a tendency that the fuel component is concentrated in the area along the inner wall 18 to establish a stratified fuel distribution in the intake passage. This stratified fuel distribution is maintained until the mixture is introduced into the working chamber 4 so that a fuel rich mixture is formed in the working chamber 4 along the peripheral portion thereof. This tendency is further enhanced by the swirling of the mixture in the working chamber 4 because the fuel component in the mixture is moved under the influence of centrifugal force toward the peripheral portion.

Thus, the ignition plug 16 is surrounded by the fuel rich atmosphere formed in the vicinity of the peripheral portion of the working chamber 4. The fuel component in the rich mixture is vapourized by the temperature rise which will be produced through adiabatic compression in the compression stroke of the engine and ignited without fail by the plug 16 when it has been energized. The lean mixture formed in the central portion of the working chamber 4 is burnt by the flame which is propagated from the area around the ignition plug 16.

Referring now to FIG. 3, the embodiment shown therein has constructions substantially similar to those in the previous embodiment, so that corresponding parts are shown by the same reference numerals as in the previous embodiment. In this embodiment, however, the intake conduit portion 7b is inclined with respect to the plane P in the direction opposite to the direction of inclination of the second passage section 15 so as to provide a passage of substantially S-shaped configuration. As in the previous embodiment, the junction between the second section 15 and the conduit portion 7b has a center 20 which lies in the plane P. It has been found that the intake passage configuration of this embodiment is further effective to provide a stratified fuel distribution in the passage 7.

The embodiment shown in FIG. 4, the general construction is substantially identical to that in the embodiment shown in FIGS. 1 and 2, however, the axis 13 of the conduit portion 7b is sidewardly offset from the plane P which includes the cylinder axis 1a and passes through the center 5a of the intake port 5, although the conduit portion 7b is intersected by the plane P at a portion sidewardly offset from the axis 13. Further, in this embodiment, the angle $\theta$ defined as an angle in a plane perpendicular to the cylinder axis 1a between the plane P and the projection on this plane of the axis 14a of the first passage section is larger than that in the previous embodiments so that the mixture flow is introduced into the working chamber with a greater circumferential velocity component than in the previous embodiments.

It has been found that the value of the angle $\theta$ has an influence on the lean misfire limit of the engine as shown in FIG. 5. For example, with the angle $\theta$ of 25° C, the engine can be operated without misfire with a mixture which is as lean as the air-fuel ratio of 19.5. Further, with the angle $\theta$ of 35°, the situation is further improved and the engine can be operated by a mixture having air-fuel ratio of 20. With the angle $\theta$ smaller than 25°, adequate swirling cannot be established, and with the angle $\theta$ greater than 80°, the intake passage must be abruptly bent resulting in an increased flow resistance and consequent decrease in flow speed. Therefore, it is recommendable to determine the angle $\theta$ between 25° and 80°, preferably between 35° and 70°. This is also true in the previous embodiments shown in FIGS. 2 and 3.

The concept of the present invention can also be applied to an engine having an exhaust gas recirculating (EGR) system. Since the exhaust combustion gas has low specific gravity as compared with fuel particles or fuel vapour, there is a tendency that the gas is concentrated to the central portion of the cylinder 1 in the engine embodying the features of the present invention. It is of course within the scope of the present invention to provide in the first passage section 14, particularly in the vicinity of the intake port 5, a guide plate for maintaining the stratified fuel distribution established in the manner as described above.

The invention has thus been shown and described with reference to specific embodiments, however, it should be noted that the invention is in no way limited to the details of the illustrated structures but changes and modifications may be made without departing from the scope of the appended claims.

We claim:

1. In a spark ignition type four cycle engine comprising cylinder means having an axis, piston means disposed in said cylinder means for reciprocating movement, cylinder head means mounted on the cylinder means to define therein working chamber means of which volume varies in response to the reciprocating movement of the piston means, intake port means formed in said cylinder head means and being associated with intake valve means, exhaust port means formed in said cylinder head means and being associated with exhaust valve means, intake passage means connected with said intake port means, means for providing a supply of air-fuel mixture to the intake passage means, said intake passage means having a first section adjacent to the intake port means which is inclined with respect to a plane including the axis of the cylinder means and passing through the center of the intake port means in such a manner that the air-fuel mixture passing therethrough is applied with a velocity component in a circumferential direction of the cylinder means to produce a swirl of air-fuel mixture, ignition plug means provided on said cylinder head means; the improvement comprising the intake passage means including a second section leading to the first section and inclined with respect to said plane in a direction opposite to the direction of inclination of the first section to provide together with the first section a curved passage portion having radially inward and outward walls, said intake passage means further including a third section leading to the second section and generally directed toward the radially inward wall of the curved passage portion, and said ignition plug means being located outside a circle having a center on the cylinder axis and a radius equal to the distance between the cylinder axis and the center of the intake port means.

2. The improvement in accordance with claim 1 in which said third section is so located that its longitudinal axis lies in said plane.

3. The improvement in accordance with claim 1 in which said third section is inclined with respect to said plane in the direction opposite to the direction of the second section.

4. The improvement in accordance with claim 1 in which said third section is so positioned that said plane intersects the third section.

5. The improvement in accordance with claim 1 in which said first, second and third sections form a passage of substantially S-shaped configuration.

6. The improvement in accordance with claim 4 in which the longitudinal axis of said third section is sidewardly offset from said plane.

7. The improvement in accordance with claim 4 in which said third section has an axis substantially aligned with said plane.

8. The improvement in accordance with claim 1 in which the angle of inclination of said first section to said plane is between 25° and 80°.

9. The improvement in accordance with claim 1 in which said first and second section of the intake passage means are formed in the cylinder head means and the third section is formed in a conduit connected with the cylinder head means.

10. In a spark ignition type four cycle engine comprising cylinder means having an axis, piston means disposed in said cylinder means for reciprocating movement, cylinder head means mounted on the cylinder means to define therein working chamber means of which volume varies in response to the reciprocating movement of the piston means, intake port means formed in said cylinder head means and being associated with intake valve means, exhaust port means formed in said cylinder head means and being associated with exhaust valve means, intake passage means connected with said intake port means, means for providing a supply of air-fuel mixture to the intake passage means, said intake passage means having a first section adjacent to the intake port means which is inclined with respect to a plane including the axis of the cylinder means and passing through the center of the intake port means in such a manner that the air-fuel mixture passing therethrough is applied with a velocity component in a circumferential direction of the cylinder means to produce a swirl of air-fuel mixture, ignition plug means provided on said cylinder head means; the improvement comprising the intake passage means including a second section leading to the first section and inclined with respect to said first section in a direction opposite to the direction of inclination of the first section with respect to the plane to provide together with the first section a curved passage portion having radially inward and outward walls, said intake passage means further including a third section leading to the second section and generally directed toward the radially inward wall of the curved passage portion, said ignition plug means being located outside a circle having a center on the cylinder axis and a radius equal to the distance between the cylinder axis and the center of the intake port means.

11. The improvement in accordance with claim 1 in which the angle of inclination of said first section to said plane is between 35° and 70°.

* * * * *